(12) United States Patent
Tyler

(10) Patent No.: US 7,581,302 B2
(45) Date of Patent: Sep. 1, 2009

(54) SOLENOID VALVE COMBINING A CORE AND CARTRIDGE IN A SINGLE PIECE

(75) Inventor: Jeffery A. Tyler, Newark, NY (US)

(73) Assignee: G. W. Lisk Company, Inc., Clifton Springs, NY (US)

( * ) Notice: Subject to any disclaimer, the term of this patent is extended or adjusted under 35 U.S.C. 154(b) by 113 days.

(21) Appl. No.: 11/034,648

(22) Filed: Jan. 13, 2005

(65) Prior Publication Data

US 2006/0151733 A1 Jul. 13, 2006

(51) Int. Cl.
*F16K 31/02* (2006.01)

(52) U.S. Cl. ............ 29/557; 29/530; 29/890.132; 251/129.15; 335/281

(58) Field of Classification Search ............ 251/129.19, 251/129.15; 29/557, 530, 890.132; 137/625.64, 137/596.16, 625.69, 625.34; 335/281
See application file for complete search history.

(56) References Cited

U.S. PATENT DOCUMENTS

| | | | | |
|---|---|---|---|---|
| 3,321,177 A | * | 5/1967 | Fendel et. al. | 251/129.21 |
| 3,460,081 A | * | 8/1969 | Tillman | 335/268 |
| 3,661,183 A | * | 5/1972 | Komaroff et al. | 137/625.65 |
| 4,220,074 A | * | 9/1980 | Reip | 137/625.64 |
| 4,664,151 A | * | 5/1987 | Piet | 137/625.66 |
| 4,719,942 A | * | 1/1988 | Hayner | 137/625.61 |
| 4,809,749 A | * | 3/1989 | Ichihashi | 137/625.65 |
| 4,919,390 A | * | 4/1990 | Ichiryu et al. | 251/129.15 |
| 5,050,840 A | * | 9/1991 | Kondo et al. | 251/129.15 |
| 5,127,624 A | | 7/1992 | Domke | 251/129 |
| 5,271,599 A | | 12/1993 | Kolchinsky et al. | 251/30 |
| 5,295,663 A | * | 3/1994 | Machat et al. | 251/333 |
| 5,303,778 A | * | 4/1994 | Vari | 251/44 |
| 5,509,439 A | * | 4/1996 | Tantardini | 137/625.65 |
| 5,564,676 A | | 10/1996 | Goloff et al. | 251/129 |
| 5,918,635 A | | 7/1999 | Wang et al. | 137/625 |
| 6,050,543 A | | 4/2000 | LaGreca et al. | 251/129 |
| 6,179,005 B1 | * | 1/2001 | Inami | 137/625.65 |
| 6,206,343 B1 | * | 3/2001 | Kato et al. | 251/129.15 |
| 6,321,767 B1 | | 11/2001 | Seid et al. | 137/15 |
| 6,564,443 B2 | * | 5/2003 | Oishi et al. | 29/596 |
| 2002/0185623 A1 | * | 12/2002 | Yamamoto et al. | 251/129.15 |
| 2003/0184422 A1 | * | 10/2003 | Matsusaka et al. | 335/220 |
| 2003/0189183 A1 | * | 10/2003 | Noller et al. | 251/129.21 |
| 2003/0218524 A1 | | 11/2003 | Trzmiel et al. | 335/220 |

* cited by examiner

*Primary Examiner*—John Bastianelli
(74) *Attorney, Agent, or Firm*—Brown & Michaels, PC

(57) ABSTRACT

A magnetic gap in a solenoid core is formed by a non-magnetic brazing material bonded into a groove encircling the core in the region of the magnetic gap. A bore through a single piece core and valve cartridge is dimensioned to intersect the brazing material and remove magnetic material bridging the gap without severing the core into separate pieces. This allows the solenoid core and the valve cartridge to be machined in a single piece with a uniform diameter bore receiving a single piece solenoid plunger and valve spool. This ensures accurate concentricity of the plunger and spool within the bore, which improves magnetic performance while reducing manufacturing costs.

33 Claims, 8 Drawing Sheets

US 7,581,302 B2

SOLENOID VALVE COMBINING A CORE AND CARTRIDGE IN A SINGLE PIECE

BACKGROUND

Solenoids are often combined with spool valves so that movement of a solenoid plunger within a solenoid core correspondingly moves a valve spool within a valve cartridge. This invention aims at reducing the manufacturing expense of making such solenoid valves while at the same time improving the accuracy, reliability, and durability of such solenoid valves.

SUMMARY

This invention involves both a method of manufacturing solenoid valves and an improved solenoid valve resulting from the manufacturing method. Both the method and the valve combine a solenoid core and valve cartridge in a single piece and can also preferably combine a solenoid plunger and valve spool in a single piece. This allows a single bore to extend through or into a body of the valve cartridge and solenoid core so that the bore can receive a uniform outside diameter of the plunger and spool having an accurate sliding fit within the bore.

The necessary magnetic gap that must exist is formed by a non-magnetic material bonded into a groove defining the gap. Then a bore extending through the bonded gap is dimensioned to remove magnetic material originally connecting the core and cartridge body across the magnetic gap. This leaves the non-magnetic bonding material forming the gap and maintaining the solenoid core and valve cartridge as a single piece that can receive the plunger and spool in a sliding fit. The single-piece construction of the solenoid core and valve cartridge allowing a single bore to receive the plunger and spool not only reduces expense, but contributes to mechanical accuracy that enhances performance of the solenoid.

DRAWINGS

FIG. 1 schematically shows a simplified example of a solenoid core and valve cartridge machined of a single piece of magnetic material.

Figure 3:
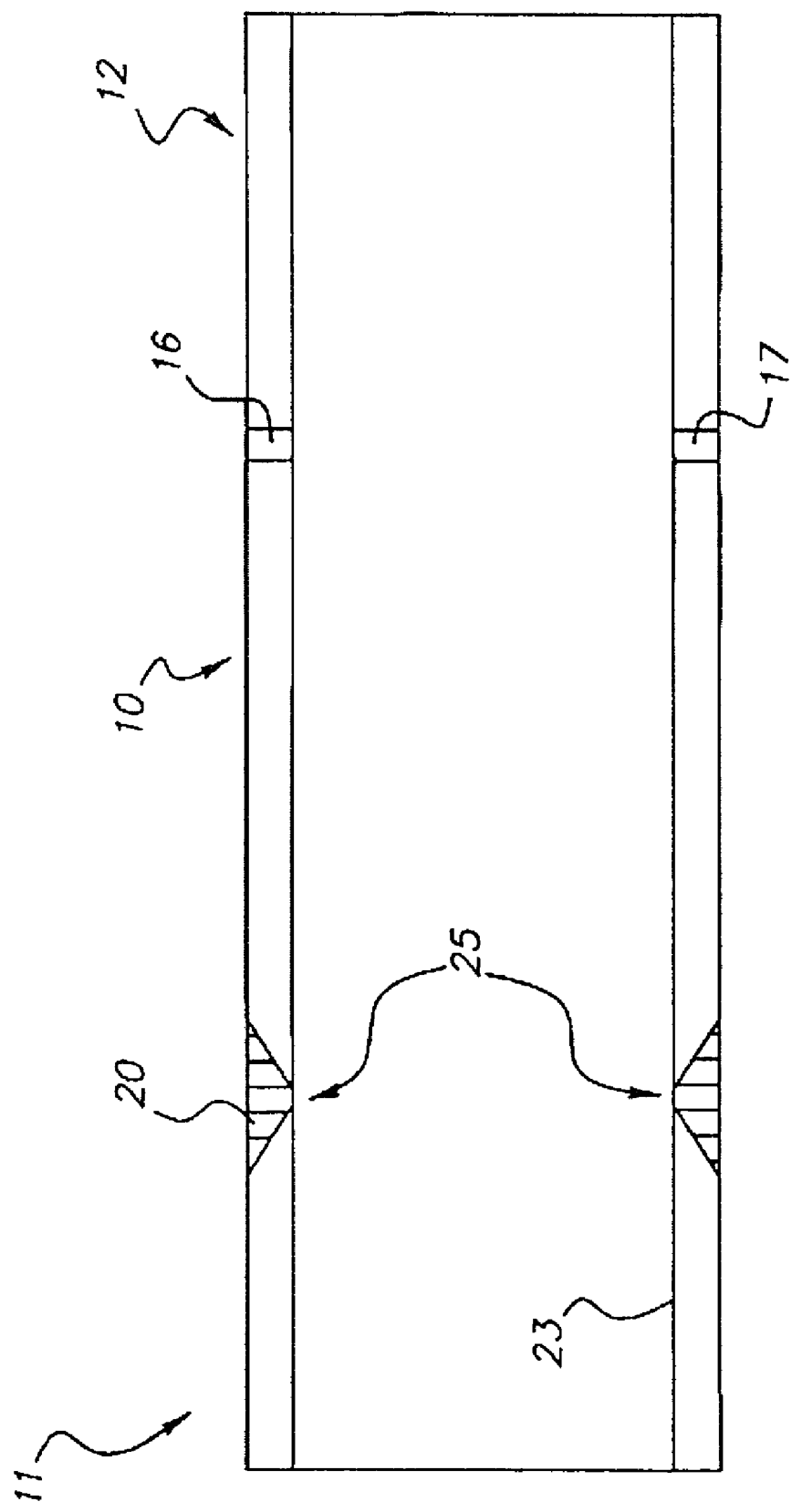
FIG. 3 shows the solenoid core and valve cartridge of FIG. 2 with a bore dimensioned to extend through the non-magnetic material in the magnetic gap and to eliminate magnetic material from bridging magnetic gap.
Figure 4:
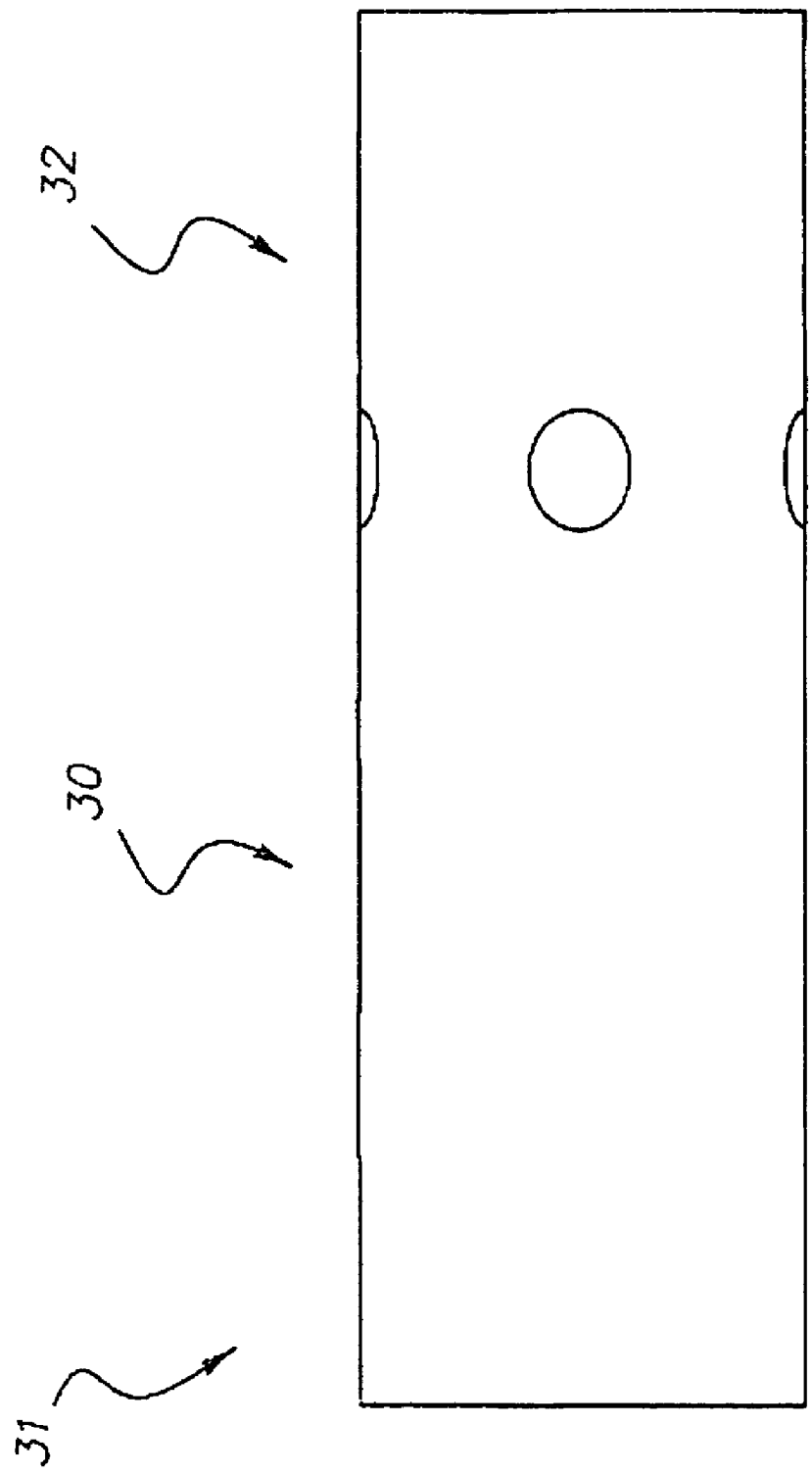

FIG. 4 schematically shows a simplified solenoid plunger and valve spool dimensioned to have a sliding fit within the solenoid core and valve cartridge of FIG. 3.

Figure 5:
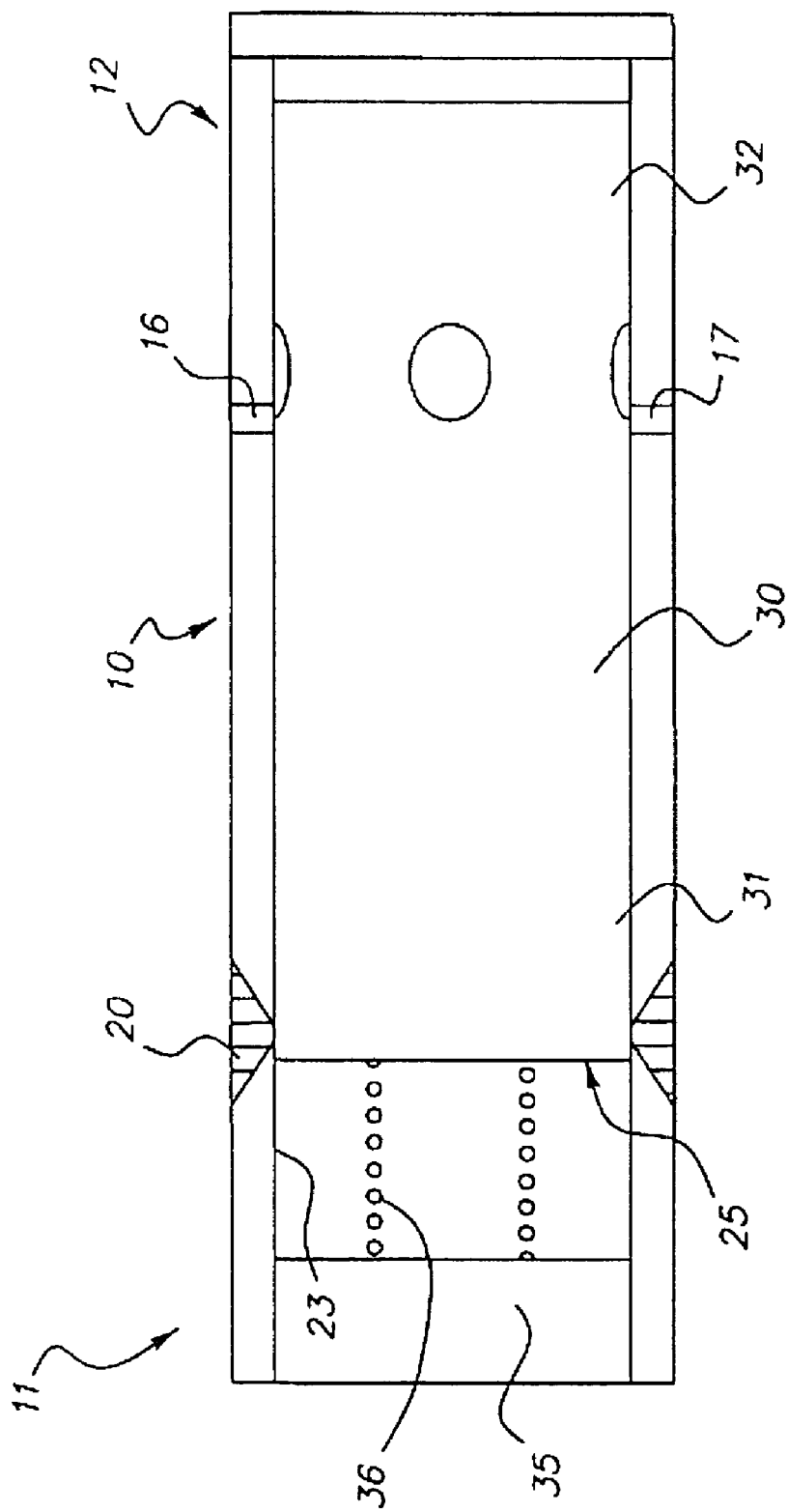

FIG. 5 schematically shows the solenoid plunger and valve spool of FIG. 4 assembled into the solenoid core and valve cartridge of FIG. 3.

Figure 6:
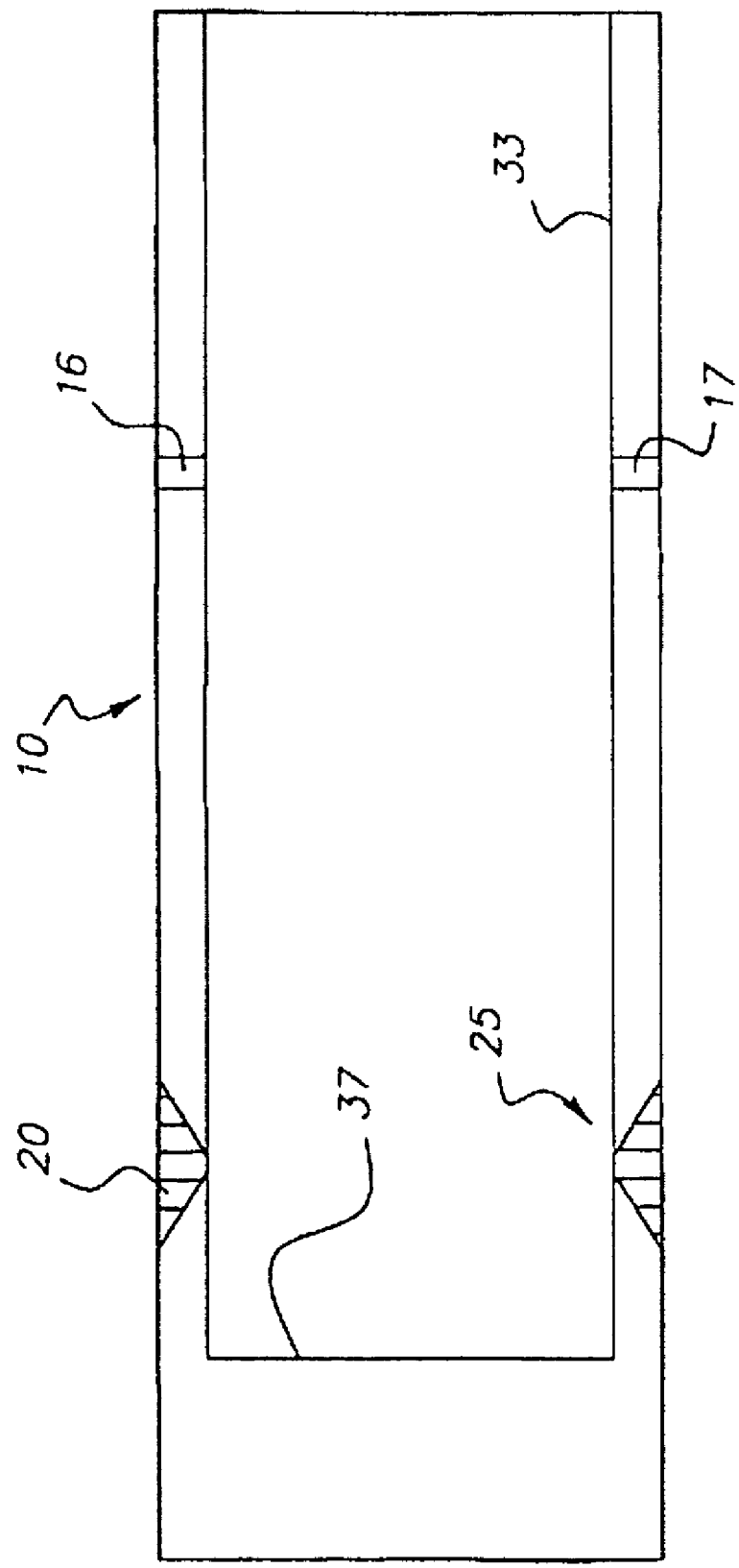

FIG. 6 shows a preferred alternative to the solenoid core and valve cartridge of FIG. 3 formed to include an integral plunger stop.

Figure 7:
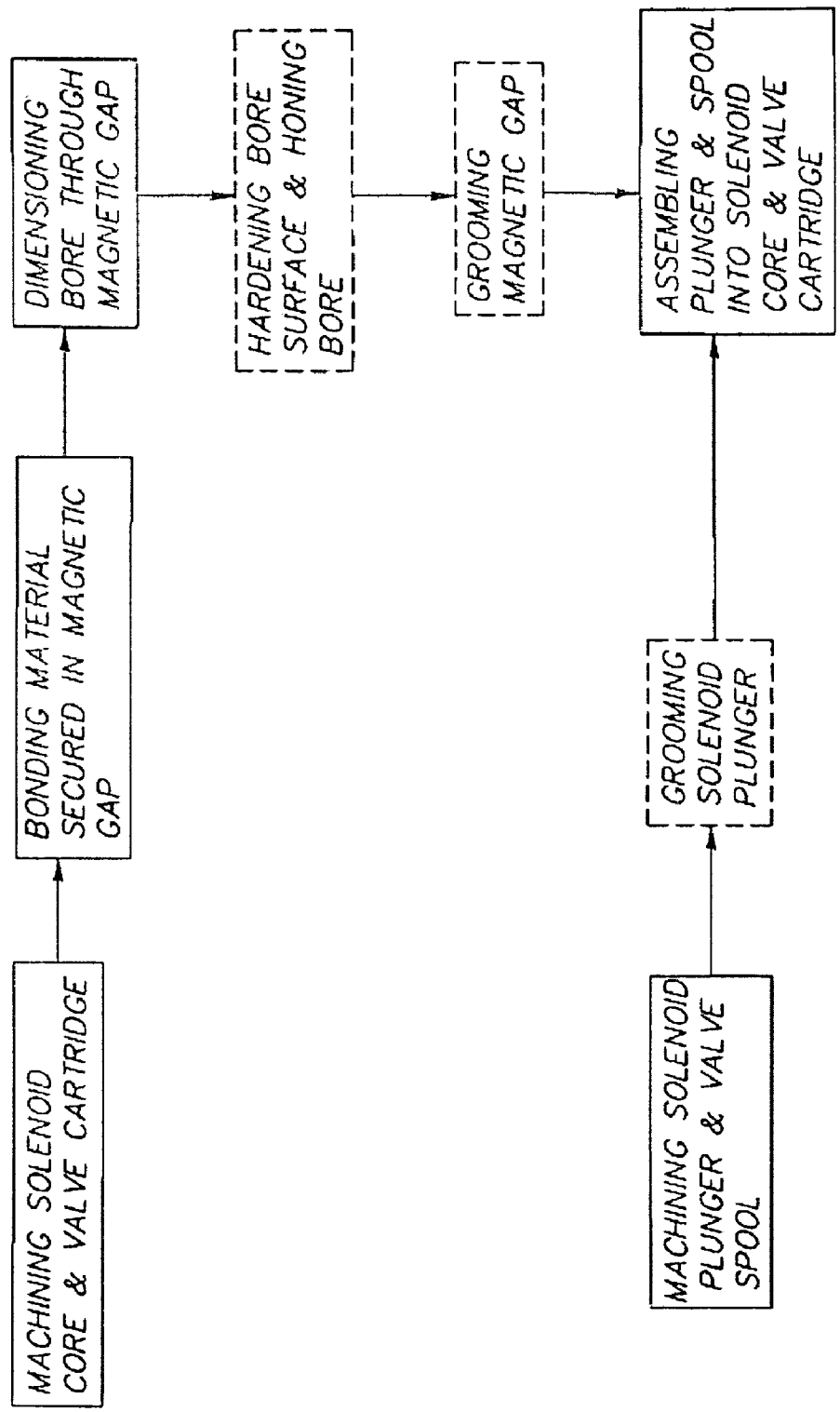

FIG. 7 is a schematic flow diagram of preferred steps involved in machining and assembling a solenoid valve according to the invention.

Figure 8:
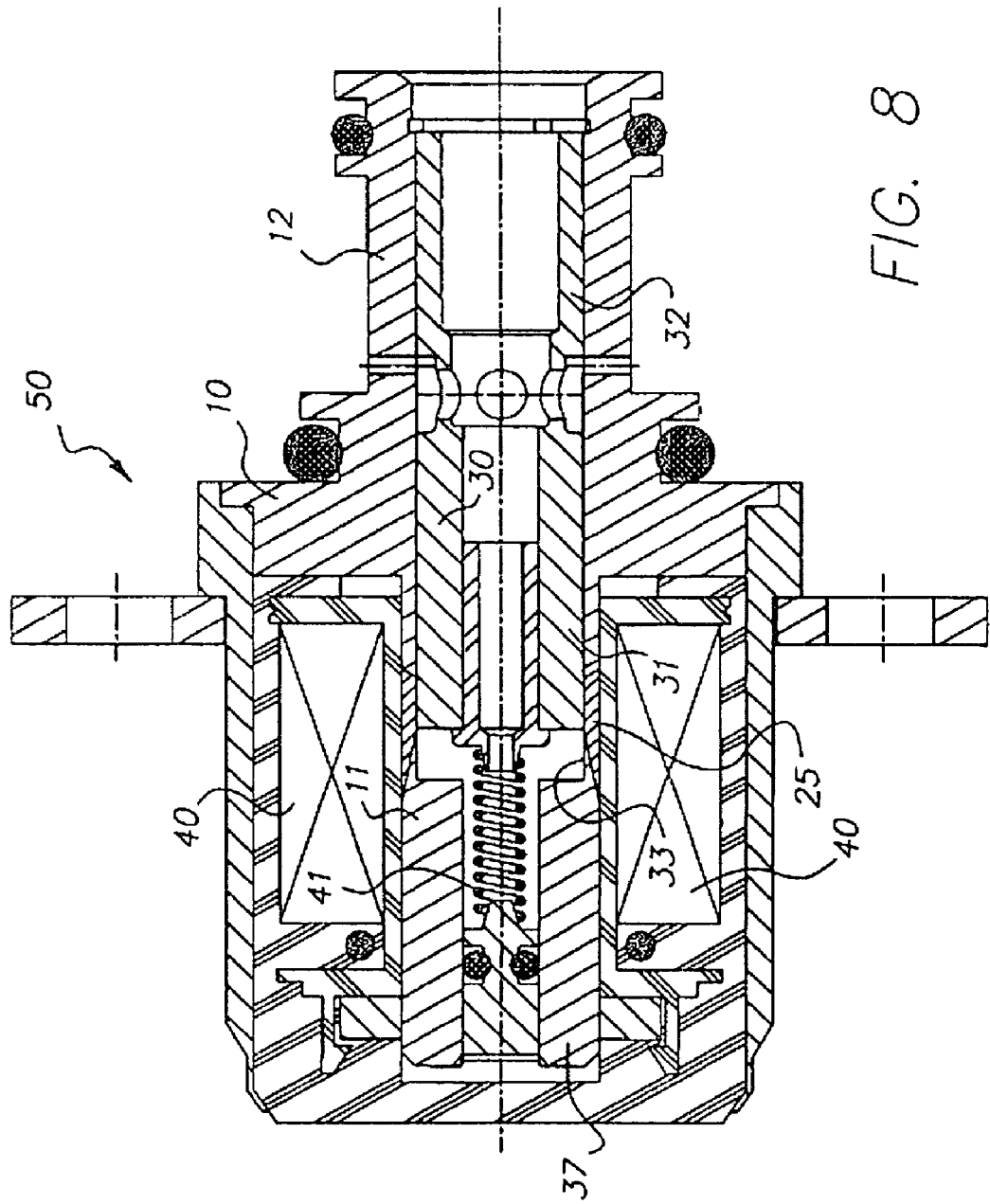

FIG. 8 shows in cross-section a preferred example of a solenoid valve made according to the invention.

DETAILED DESCRIPTION

Preferred steps in a method of making a solenoid valve according to the invention are diagrammed in FIG. 7 and schematically illustrated in FIGS. 1-6. One preferred embodiment resulting from the schematically illustrated method steps is shown in FIG. 8. Many other embodiments are possible and can differ in many details from what is illustrated.

The inventive method and solenoid valve includes a single piece solenoid core and valve cartridge in which a solenoid plunger and valve spool are assembled. The solenoid core and valve cartridge body 10 is preferably machined of a single piece of magnetic material as shown in a simplified configuration in FIG. 1. One end region 11 of body 10 constitutes a solenoid core, and an opposite end region 12 constitutes a valve cartridge.

Core and cartridge body 10 includes an encircling groove 15 configured to predefine a form and location of a magnetic gap. Groove 15 extends radially inward and surrounds or encircles body 10; groove 15 also preferably has a generally triangular shape that is preferred for optimum performance of a magnetic gap. The preferred triangular cross-sectional shape for the magnetic gap can be formed by conical surfaces 15a and 15b meeting at an apex 15c.

Figure 1:
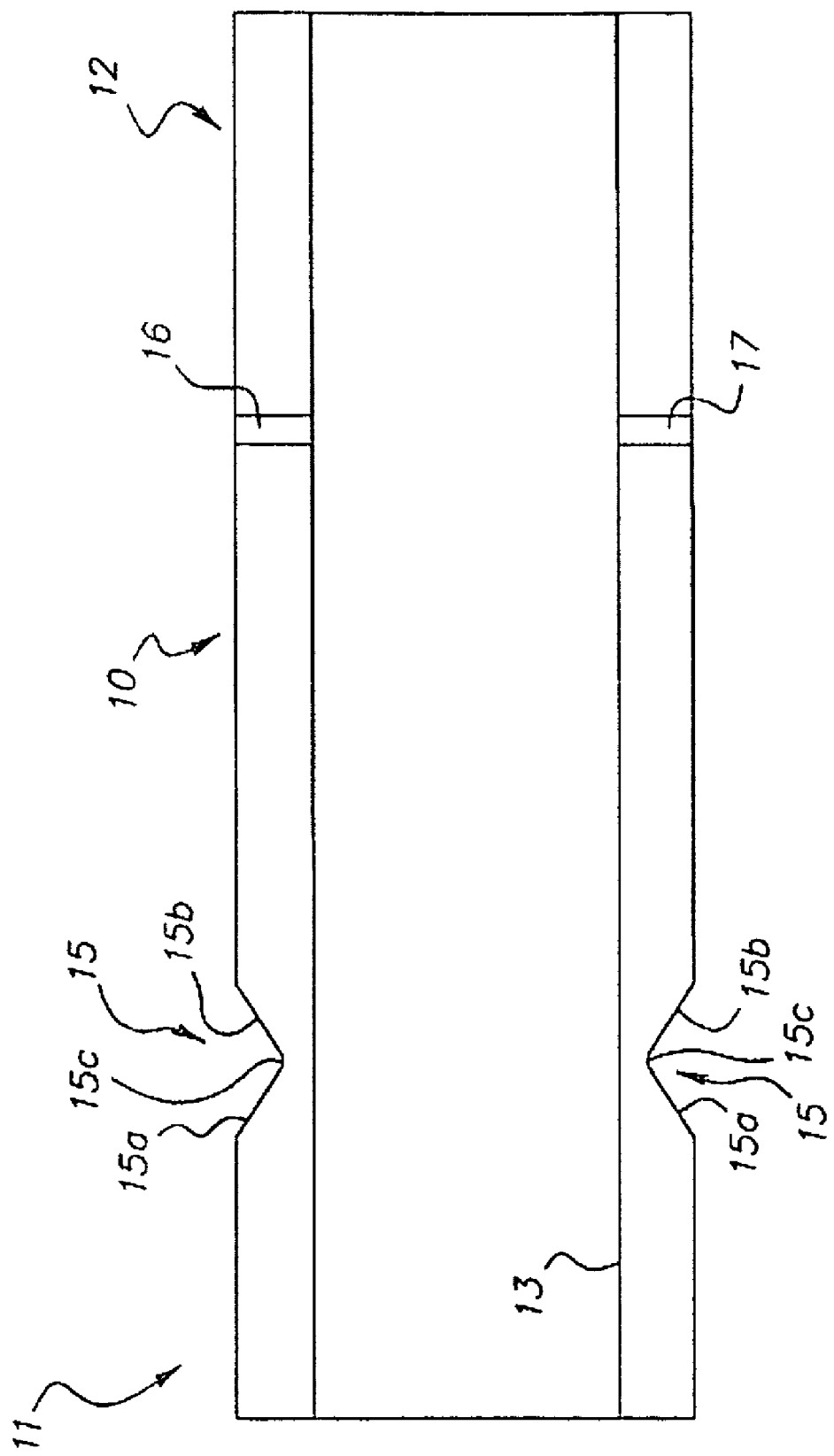

A preliminary bore 13 can be formed to extend into or through body 10, and as illustrated in FIG. 1, bore 13 extends all the way through the combined core and cartridge 10. Bore 13 can also extend only part way through body 10 and can enter body 10 from either cartridge end 12 or core end 11.

Groove 15 extends radially inward toward preliminary bore 13, but does not meet or intersect bore 13, which would sever body 10 into two pieces. In other words, apex 15c forming the deepest part of groove 15 stays clear of the inside surface of preliminary bore 13 so that magnetic material surrounding bore 13 maintains body 10 as a single piece including core 11 and cartridge 12.

For the first step of machining combination core and cartridge 10, it is also possible to omit preliminary bore 13, and supply a necessary bore as a later step in the preferred method. Input and output ports 16 and 17 for valve cartridge 12 can be machined in the preliminary stage illustrated in FIG. 1, or machined later in the preferred method.

The method step illustrated in FIG. 1, with the alternative possibilities explained above, preferably constitutes the first step in the upper left corner of FIG. 7. A second step, following the establishment of groove 15 and illustrated in FIG. 2, involves bonding a non-magnetic material 20 in groove 15. Material 20 is preferably a non-magnetic brazing material, but may also be formed of other materials that are not magnetic and can bond to and conform to the shape of groove 15 to form the predetermined shape of the magnetic gap. Bonding material 20 is also preferably molten or formable when applied to groove 15 so that material 20 can flow into and fill groove 15 while bonding to the surfaces 15a and 15b of groove 15 and setting, hardening, or bonding to itself to extend across the intended magnetic gap. Suitable materials 20 are sufficiently non-magnetic and sufficiently strong in bonding and are durable enough to withstand the remaining manufacturing steps and endure the life of the solenoid valve.

The next step, as illustrated in FIG. 3 and in the upper right corner of FIG. 7, occurs after bonding material 20 is established in groove 15. This step preferably involves dimensioning preliminary or predecessor bore 13 of FIG. 2 to a larger diameter of working bore 23 of FIG. 3. This removes magnetic material and makes the inside surface of working bore 23 intersect apex 15c to pass through bonding material 20 and eliminate any magnetic material bridging magnetic gap 25.

This enlargement of bore 23 removes magnetic material originally connecting body 10 across groove 15, but this does not sever body 10 into separate parts, because solenoid core 11 and valve cartridge 12 remain connected and unitary by virtue of bonding-material 20.

Figure 2:
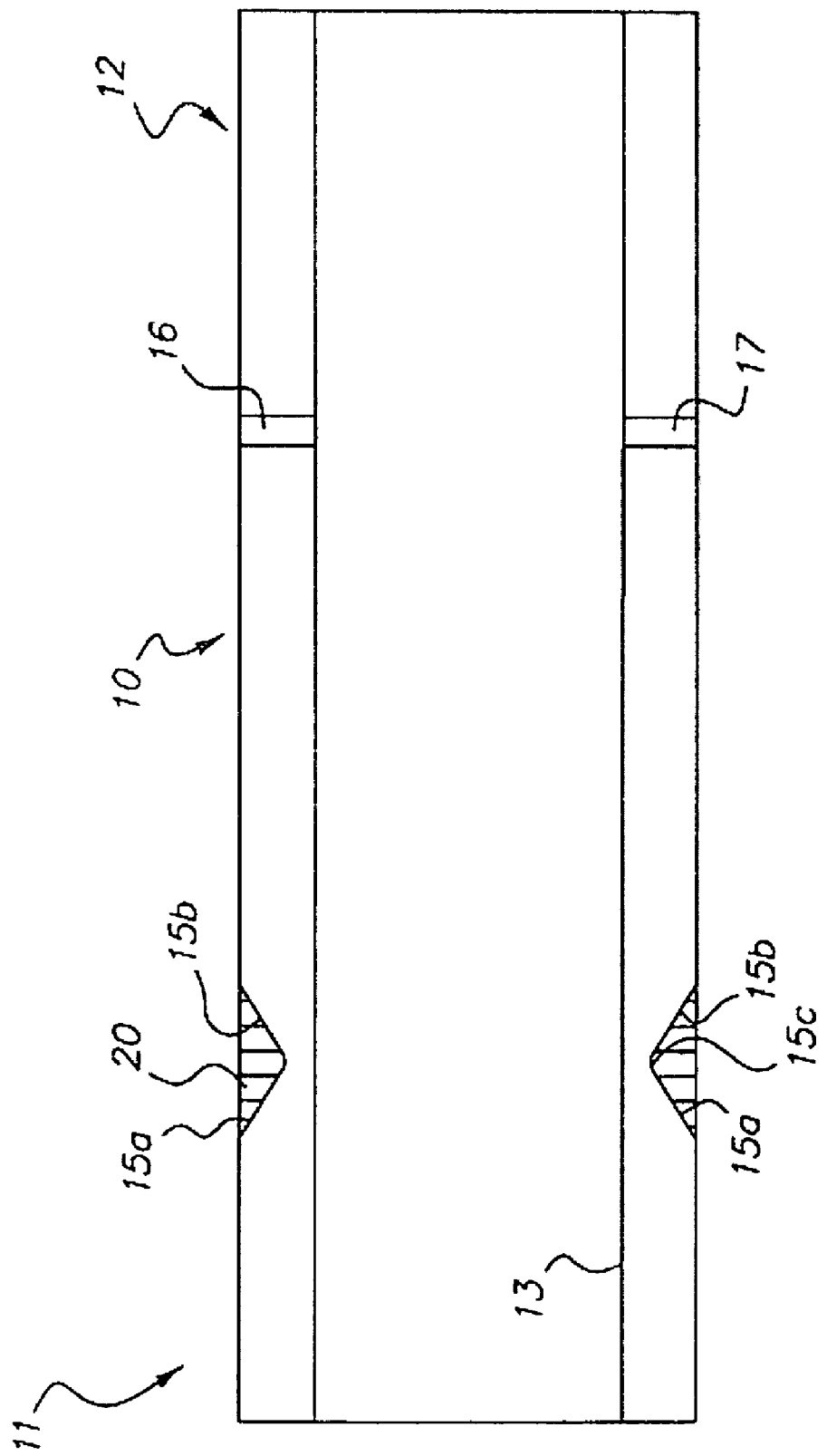
FIG. 2 shows the solenoid core and valve cartridge of FIG. 1 with non-magnetic bonding material secured in a pre-determined location of a magnetic gap in the solenoid core.

It is also possible to form working bore 23 at the stage illustrated in FIG. 3, without using a preliminary or predecessor bore 13 as illustrated in FIGS. 1 and 2. Preliminary bore 13 is preferred over a more massive bore 23 performed later, because the boring process generates heat and may possibly warp core and cartridge 11 or impair or distort material 20 bonding core 11 together across the magnetic gap.

Bore 23 is also preferably formed with a single uniform diameter extending as far as necessary into or through body 10. This simplifies and improves the accuracy of a sliding fit within bore 23 of solenoid plunger and valve spool 30, as illustrated in FIG. 4. Plunger and spool 30 can be machined to a uniform outside diameter having an accurate sliding fit within bore 23, and this sliding fit can be enhanced by extending the full length of plunger and spool 30.

Plunger and spool 30 is shown in FIG. 5 as assembled in core and cartridge 10 where it can slide back and forth in response to a solenoid coil that is omitted for simplicity. A plunger stop 35 is pressed into a core end of bore 23, and a plunger spring 36 engages plunger 31 while spool 32 is moved relative to input and output ports 16 and 17.

The necessary bore into core and cartridge 10 can also be a blind working bore 33, as shown in FIG. 6 to form integral plunger stop 37. Many variations on plunger stops, plunger springs, and other details are clearly possible. A blind bore into body 10 can also leave cartridge end 12 closed and can then use a press fitted plunger stop 35, such as shown in FIG. 5.

Two remaining, but optional and alternative, steps in the method of making core and cartridge 10 are shown within broken line boxes in the diagram of FIG. 7. These include hardening and honing working bore 23 or 33 and grooming magnetic gap 25.

Hardening the inside surface of bore 23 or 33 can be done by heat treatment, by cryogenic treatment, and possibly by other expedients to surface harden the material for accuracy and wear life of the solenoid plunger and spool. Whether bore surfaces 23 or 33 are hardened depends partly on the uses and durability that will be required of the resulting solenoid valve.

Magnetic grooming optimizes the performance of solenoid plunger 11 within magnetic gap 25 by slightly enlarging a clearance between plunger 31 and magnetic gap 35. This can be done by slightly reducing the diameter of plunger 31 in the region of its movement in magnetic gap 25, or by slightly enlarging bore 23 or 33 in the region of magnetic gap 25. Either way, very little material is removed, and this occurs only in the narrow axial region of the magnetic gap so that no illustratable change occurs. Optimum grooming is preferably determined by computerized magnetic analysis, which is well understood in the solenoid valve art, and which establishes the amount and location of material to be removed.

The machining of solenoid plunger and valve spool 30 as illustrated in FIG. 4 and in the lower left corner of FIG. 7 preferably occurs with plunger 31 and spool 32 united in a single piece. This helps ensure that an outside diameter of plunger and spool piece 30 has an accurate sliding fit within bore 23 or 33. Changes in diameter or use of more than one piece introduces possible inaccuracies that can impair magnetic performance. Hardening and honing of bores 23 or 33 also contributes to accuracy of movement of plunger 31 and spool 32.

Assembling plunger and spool 30 into core and cartridge 10, can result in a preferred embodiment of a solenoid valve 50 with added components such as shown in FIG. 8. These include a solenoid coil 40, a plunger spring 41 arranged in a plunger stop 37, and various seals, connectors, and mounting elements such as are generally known in the solenoid valve art. Valve 50 also includes the above-described body 10 having a core region 11 and a cartridge region 12 formed in a single piece with a bore 33 and a magnetic gap 25. A single piece plunger and spool 30 includes plunger 31 and spool 32 moving in a sliding fit in bore 33.

Experience with the invention has shown that the superior concentric accuracy achieved by forming core and cartridge 10 as a single piece with a single diameter bore and forming plunger and spool 31 of a single piece having a single outside diameter fitting the bore has greatly improved performance for the solenoid valve. Accurate concentricity minimizes magnetic side loading that can occur when a plunger is slightly eccentric relative to its core. Any such side loading results in hysteresis losses and degraded performance. Also, ensuring accurate concentricity of the plunger within the core allows the solenoid to operate at a higher frequency of for example, 300 Hz, rather than 200 Hz, which has been a typical previous limit. This not only improves magnetic performance, but also diminishes oscillations of the spool and smoothes out liquid flow through the valve. These advantages apply especially to proportional solenoid valves, but also benefit the operation of on/off solenoid valves and solenoid operated poppet valves. These advantages can also be obtained at a somewhat reduced manufacturing cost.

What is claimed is:

1. A solenoid operated spool valve comprising:
   a single piece valve cartridge and solenoid core formed generally of magnetic material;
   a non-magnetic bonding material bonded to the magnetic material in a configuration forming a magnetic gap;
   a working bore extending through the non-magnetic material in the magnetic gap to remove magnetic material from the magnetic gap and leave the magnetic material united in the original single piece by the bonding material; and
   the working bore receiving a solenoid plunger and valve spool having a uniform outside diameter with a sliding fit in the working bore.

2. The solenoid operated spool valve of claim 1 groomed for magnetic performance by slightly enlarging a clearance between the solenoid plunger and the magnetic gap.

3. The solenoid operated spool valve of claim 1 including a pair of conical surfaces defining boundaries of the magnetic gap, the bonding material being bonded to the conical surfaces to hold the magnetic material together, and the bonding material extending to the working bore.

4. The solenoid operated spool valve of claim 1 wherein the configuration of the non-magnetic material is an annulus encircling the working bore.

5. The solenoid operated spool valve of claim 1 wherein the bonding material is a brazing material that withstands surface hardening heat treatment.

6. The solenoid operated spool valve of claim 1 wherein the solenoid plunger and the valve spool are formed of a single piece of material.

7. The solenoid operated spool valve of claim 1 wherein the magnetic gap is configured by a groove encircling the solenoid core.

8. A solenoid operated spool valve comprising:
   a single piece plunger and spool having a uniform outside diameter;
   a single piece solenoid core and valve cartridge with a working bore having a uniform inside diameter receiving the plunger and spool in an accurate sliding fit;

the solenoid core and the valve cartridge being formed of magnetic material separated by a magnetic gap formed of non-magnetic brazing material; and the brazing material being bonded to the magnetic material on opposite sides of the magnetic gap to hold the magnetic material united along the length of the working bore.

9. The solenoid operated spool valve of claim 8 wherein magnetic performance of the solenoid is groomed by slightly enlarging a clearance between the plunger and the magnetic gap.

10. The solenoid operated spool valve of claim 8 wherein an inside surface of the bore is hardened.

11. The solenoid operated spool valve of claim 8 wherein the magnetic gap is defined by a pair of surfaces encircling and intersecting the working bore to form an annulus.

12. The solenoid operated spool valve of claim 8 made by brazing non-magnetic bonding material in a groove defining the magnetic gap and then dimensioning-a bore through the solenoid core and valve cartridge to eliminate magnetic material bridging the magnetic gap and to form the working bore while leaving the valve cartridge and solenoid core united by the bonding material.

13. The solenoid operated spool valve of claim 8 made by the additional step of hardening an inside surface of the working bore without weakening bonds between the brazing material and the magnetic material, and then honing the working bore.

14. A valve cartridge and solenoid core formed from a single piece of magnetic material by the steps of
forming a groove extending radially inward around a region predefining a magnetic gap;
configuring the groove as a pair of surfaces that intersect within the magnetic material;
at least partially filling the groove with a non-magnetic brazing material that bonds to the surfaces of the groove in the shape of the magnetic gap; and
dimensioning a bore extending through the magnetic gap so that the bore eliminates magnetic material bridging the magnetic gap and intersects the brazing material while leaving the valve cartridge and the solenoid core united by the brazing material.

15. The valve cartridge and solenoid core of claim 14 made by the additional step of forming a solenoid plunger and valve spool having a uniform outside diameter with a sliding fit in the bore.

16. The valve cartridge and solenoid core of claim 15 made by the additional step of grooming magnetic performance by slightly enlarging a clearance between the plunger and the magnetic gap.

17. The valve cartridge and solenoid core of claim 14 made by the additional step of forming the bore by enlarging a preliminary bore extending through the magnetic gap within the groove.

18. The valve cartridge and solenoid core of claim 14 made by the additional step of hardening and honing an inside surface of the bore.

19. The solenoid operated spool valve of claim 14 wherein the magnetic gap extends annularly around the bore and is wider with increasing radial distance from the bore.

20. A solenoid-operated spool valve, made by the method comprising:
forming a valve cartridge and a solenoid core of a single piece of magnetic material;
forming an outer groove encircling the solenoid core and extending radially into the magnetic material to predefine a magnetic gap;
at least partially filling the groove with a non-magnetic bonding material that bonds to walls of the groove in the shape of the magnetic gap;
dimensioning a bore extending at least part way through the cartridge and the core so that the bore intersects the groove and eliminates magnetic material bridging the magnetic gap while leaving the valve cartridge and the solenoid core united and held together by the bonding material forming the magnetic gap; and
forming a solenoid plunger and a valve spool to slide accurately within the bore.

21. The solenoid-operated spool valve-of claim 20 made by the additional step of hardening an inside surface of the bore.

22. The solenoid-operated spool valve of claim 21 made by the additional step of honing the hardened inside surface of the bore to receive the spool and plunger.

23. The solenoid-operated spool valve-of claim 20 made by the additional step of grooming magnetic performance by slightly enlarging a clearance between the plunger and the magnetic gap.

24. The solenoid-operated spool valve-of claim 20 made by the additional step of forming the solenoid plunger and the valve spool of a single piece of material having a uniform outside diameter accurately fitting the bore.

25. The solenoid-operated spool valve-of claim 20 wherein the groove is formed by intersecting surfaces.

26. The solenoid-operated spool valve-of claim 25 wherein the bore removes the intersection of the surfaces.

27. The solenoid-operated spool valve-of claim 25 wherein the non-magnetic bonding material extends anularly around the solenoid core.

28. A solenoid operated spool valve comprising:
a single piece plunger and spool having a uniform outside diameter;
a single piece solenoid core and valve cartridge with a working bore having a uniform inside diameter receiving the plunger and spool in an accurate sliding fit;
the solenoid core and the valve cartridge being formed of magnetic material separated by a magnetic gap formed of non-magnetic brazing material;
opposite sides of the magnetic gap being configured as surfaces encircling and intersecting the working bore; and
the brazing material being bonded to the surfaces to hold the magnetic material united on opposite sides of the magnetic gap.

29. The solenoid operated spool valve of claim 28 wherein the brazing material is selected to withstand heat treatment on an inside surface of the bore.

30. The solenoid operated spool valve of claim 28 wherein magnetic performance of the solenoid is groomed by slightly enlarging a clearance between the plunger and the magnetic gap.

31. The solenoid operated spool valve of claim 28 wherein an inside surface of the bore is hardened.

32. The solenoid operated spool valve of claim 28, wherein the surfaces initially intersect with each other within the magnetic material and then the working bore intersects the surfaces to remove magnetic material from the magnetic gap.

33. The solenoid operated spool valve of claim 28 wherein the magnetic gap forms an annulus around the working bore and becomes wider with increasing radial distance from the working bore.

* * * * *

UNITED STATES PATENT AND TRADEMARK OFFICE
CERTIFICATE OF CORRECTION

| | |
|---|---|
| PATENT NO. | : 7,581,302 B2 |
| APPLICATION NO. | : 11/034648 |
| DATED | : September 1, 2009 |
| INVENTOR(S) | : Jeffery A. Tyler |

Page 1 of 1

It is certified that error appears in the above-identified patent and that said Letters Patent is hereby corrected as shown below:

Column 5, line 58: Delete "solenoid operated spool valve" and substitute "valve cartridge and solenoid core".

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,581,302 B2
APPLICATION NO. : 11/034648
DATED : September 1, 2009
INVENTOR(S) : Jeffery A. Tyler Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 505 days.

Signed and Sealed this

Fourteenth Day of September, 2010

David J. Kappos
*Director of the United States Patent and Trademark Office*